(12) United States Patent
Schunk

(10) Patent No.: US 8,351,745 B2
(45) Date of Patent: Jan. 8, 2013

(54) 2-TO-1 PLASTIC OPTICAL FIBER (POF) OPTICAL COUPLER, A BI-DIRECTIONAL OPTICAL COMMUNICATIONS LINK THAT EMPLOYS THE 2-TO-1 POF OPTICAL COUPLER, AND A METHOD FOR PERFORMING 2-TO-1 OPTICAL COUPLING

(75) Inventor: Nikolaus W. Schunk, Maxhuette-Haidhof (DE)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 678 days.

(21) Appl. No.: 12/617,858

(22) Filed: Nov. 13, 2009

(65) Prior Publication Data
US 2011/0116744 A1  May 19, 2011

(51) Int. Cl.
*G02B 6/04* (2006.01)
(52) U.S. Cl. ............................. 385/45; 385/39
(58) Field of Classification Search ............. 385/39, 385/45
See application file for complete search history.

(56) References Cited

U.S. PATENT DOCUMENTS 6,473,555 B1 * 10/2002 Kragl et al. ............... 385/146
7,206,493 B2 *  4/2007 Kragl ........................ 385/146

FOREIGN PATENT DOCUMENTS

| CN | 1657995 A | 8/2005 |
| JP | 2125206 A | 5/1990 |
| JP | 2001166178 A | 6/2001 |

OTHER PUBLICATIONS

Abang Annuar Ehsan, Sahbudin Shaari and Mohd Kamil Abd. Rahman, Low Cost 1×2 Acrylic-based Plastic Optical Fiber Coupler with Hollow Taper Waveguide, PIERS Online, 2009, pp. 129-132, vol. 5, No. 2.
Plastic Optical Fiber Couplers (Splitters), Industrial Fiber Optics, Inc., pp. 67-68.

* cited by examiner

*Primary Examiner* — Michael Maskell

(57) ABSTRACT

A 2-to-1 POF optical coupler, a bi-directional link that employs the coupler, and methods for performing 2-to-1 optical coupling are provided, wherein the 2-to-1 POF optical coupler is configured to provide a carefully-selected amount of cross-sectional overlap at the interface between the end face of a main POF or POF pigtail and the end face of the coupler. The amount of overlap is selected to ensure that optical coupling losses are reduced and optical efficiency is increased in both directions in a bi-directional optical communications links. Consequently, signal integrity is improved, limitations on link length are relaxed, and overall link performance is improved while, at the same time, overall link costs are reduced.

31 Claims, 7 Drawing Sheets

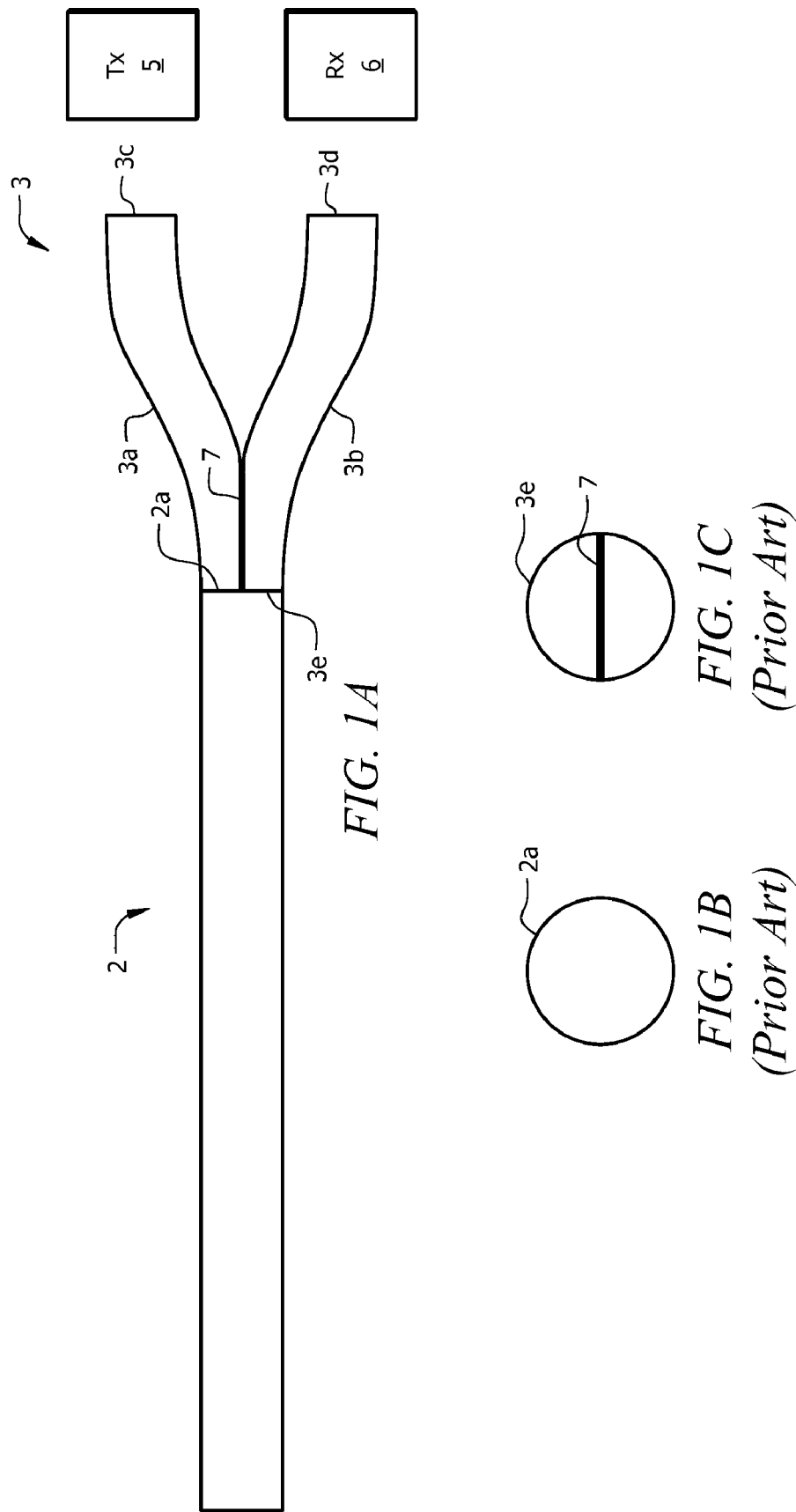

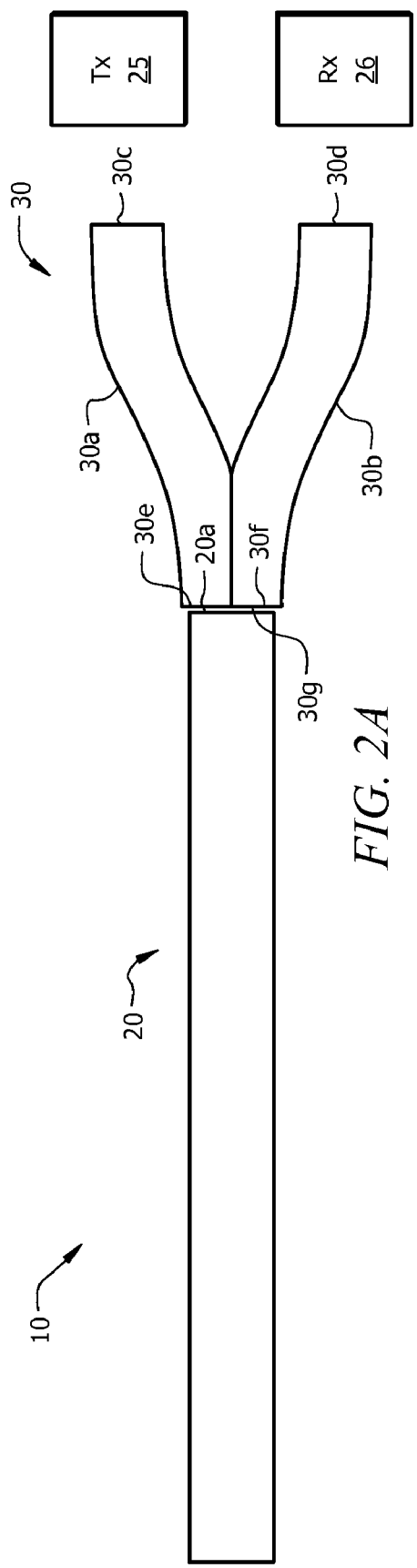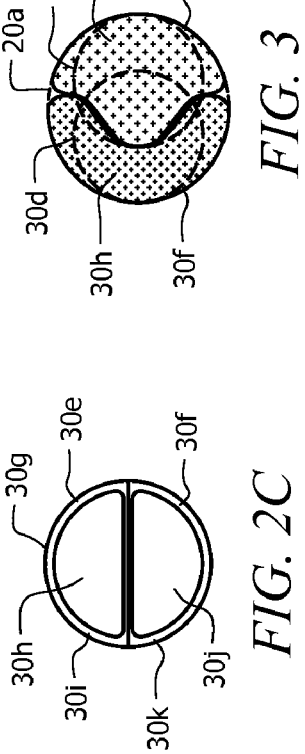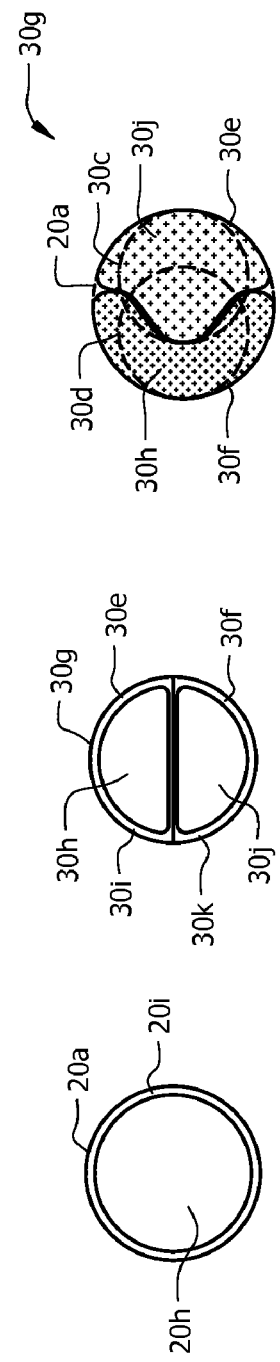

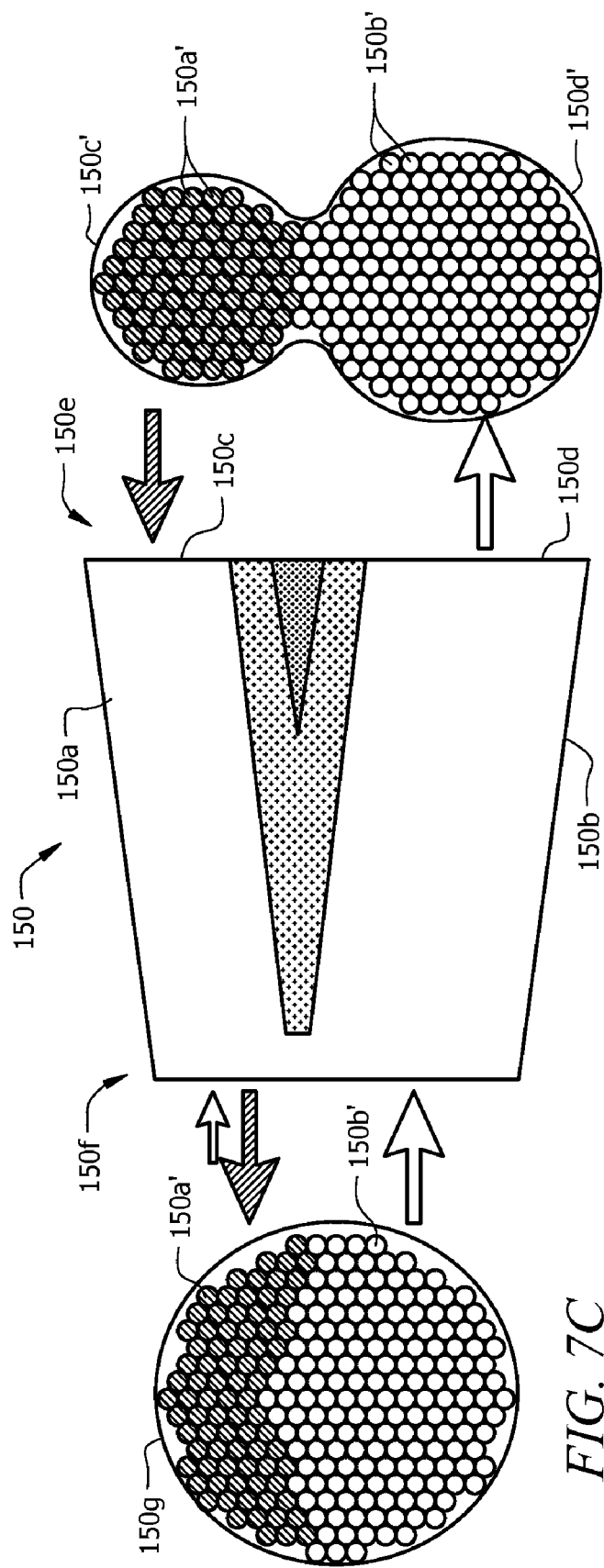

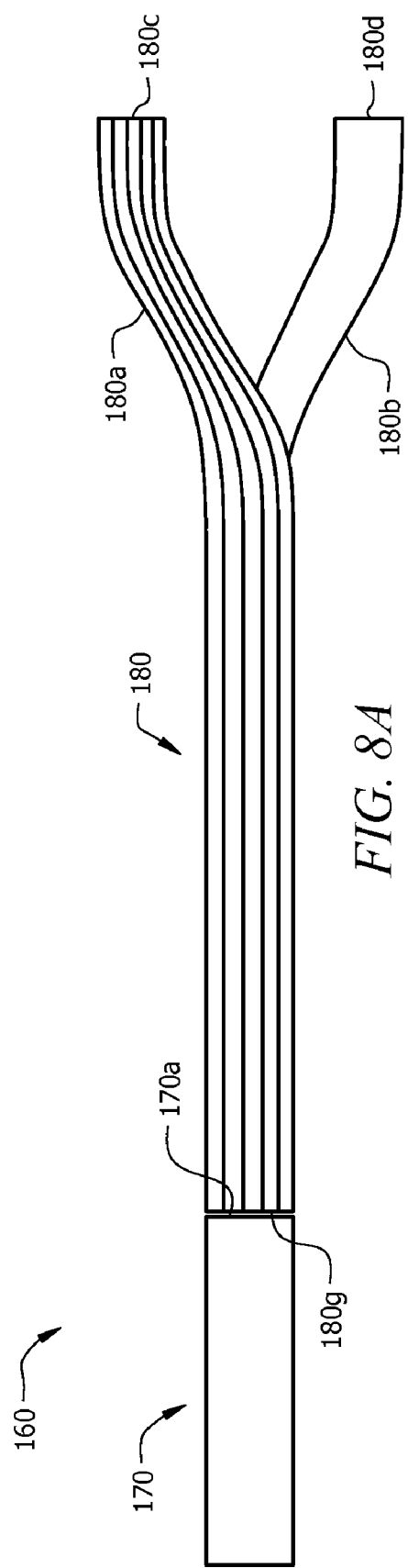
FIG. 8A
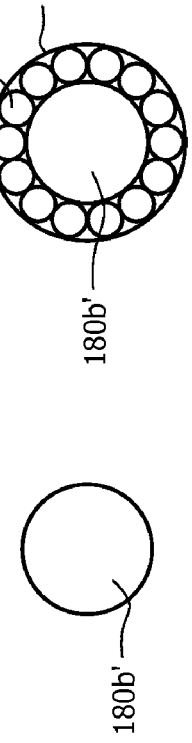
FIG. 8B
FIG. 8C
FIG. 8D

＃ 2-TO-1 PLASTIC OPTICAL FIBER (POF) OPTICAL COUPLER, A BI-DIRECTIONAL OPTICAL COMMUNICATIONS LINK THAT EMPLOYS THE 2-TO-1 POF OPTICAL COUPLER, AND A METHOD FOR PERFORMING 2-TO-1 OPTICAL COUPLING

TECHNICAL FIELD OF THE INVENTION

The invention relates to plastic optical fibers (POFs), and more particularly, to a 2-to-1 POF coupler for optically coupling an end of a POF with transmission and receive channels of an optical communications device.

BACKGROUND OF THE INVENTION

In optical communications networks, optical fibers are used to carry optical data signals between optical communications devices connected on opposite ends of optical fibers. In some optical communications networks, a device known as a 2-to-1 optical coupler is used to optically couple signals between an end of an optical fiber and transmit and receive channels of an optical communications device. The 2-to-1 optical coupler is generally an optical splitter comprising a branch-like structure having first, second and third ends. A first branch of the optical coupler extends between the first and second ends of the optical coupler. A second branch of the coupler extends between the first and third ends of the optical coupler.

2-to-1 optical couplers are used in a variety of applications, including, for example, bi-directional communications over POFs. When used for bi-directional communications, the first end of the optical coupler is connected to a first end of a main POF and the second and third ends of the coupler are connected to transmit and receive sides, respectively, of an optical transceiver. In a transmit mode, optical data signals generated on the transmit side of the optical transceiver are passively routed over the 2-to-1 optical coupler from the second end of the coupler to the first end of the coupler. As the optical data signals arrive at the first end of the optical coupler, they are optically coupled into the first end of the main POF. In a receive mode, optical data signals that pass out of the first end of the main POF pass into the first end of the optical coupler and are then passively routed along the second branch of the coupler from the first end of the coupler to the third end of the optical coupler. As the optical data signals pass out of the third end of the coupler, they are received in the receive side of the optical transceiver.

FIG. 1A illustrates a side view of a portion of a typical POF bi-directional optical communications link, which includes a 1.0 millimeter (mm) POF 2 and a 2-to-1 optical coupler 3. The POF 2 functions as the main optical fiber of the link. In one direction, the 2-to-1 optical coupler 3 routes optical signals generated by a transmitter (Tx) onto an end face 2a of the main POF. In the other direction, the 2-to-1 optical coupler 3 routes optical signals passing out of the end face 2a of the main POF 2 onto a photosensor (not shown) of receiver (Rx) 6. The Tx 5 and the Rx 6 are typically parts of an optical transceiver module (not shown). The main POF 2 is referred to as a 1.0 mm POF due to the fact that the diameter of the core of the POF 2 is 1.0 mm. The 2-to-1 optical coupler 3 has the branch-like splitter configuration described above, with each branch comprising a respective branch POF 3a and 3b. The branch POFs 3a and 3b are typically also 1.0 mm POFs. The end face 2a of the main POF 2 has a cross-sectional area equal to $5/32\pi$, where $\pi = 3.14159$. Likewise, the end faces 3c and 3d of the branch POFs 3a and 3b, respectively, have -sectional areas equal to $5/32\pi$. However, the end faces of the branch POFs 3a and 3b that interface with the end face 2a of the main POF 2 are each reduced in cross-sectional area by approximately 50% to form a coupler end face 3e having a cross-sectional area of $5/32\pi$, which matches the cross-sectional area of the end face 2a of the main POF 2.

FIGS. 1B and 1C illustrate front plan views of the end faces 2a and 3e of the main POF 2 and of the coupler 3, respectively. It can be seen from FIGS. 1B and 1C that the end faces 2a and 3e have equal cross-sectional areas. A variety of techniques may be used to reduce the cross-sectional areas of the end faces of the branch POFs 3a and 3b to form the coupler end face 3e. Polishing and chisel cutting are two well know techniques that are used for this purpose. In addition, in some cases a technique known as metal evaporation is used to form a metal layer 7 between the branch POFs 3a and 3b at the coupler end face 3e to prevent light from being coupled between the branch POFs, i.e., to prevent optical cross-talk. A configuration of the type shown in FIGS. 1A-1C is disclosed in U.S. Pat. No. 7,206,493. Another technique for varying the cross-sectional areas of the end faces of the branch POFs is a hot molding technique that uses a molding tool in combination with heat to provide the coupler end face with a desired non-circular cross-sectional shape. Such a technique is disclosed in U.S. Pat. No. 6,473,555.

One of the disadvantages of 2-to-1 optical coupler configurations of the type shown in FIGS. 1A-1C is that there is very little or no cross-sectional overlap between the end face 2a of the main POF and the end face 3e of the 2-to-1 optical coupler 3. The lack of overlap between the end faces 2a and 3e can lead to the occurrence of unacceptable optical insertion losses in the transmit and/or receive directions. Excessive insertion losses can degrade signal quality and can limit the length of the optical link. While the technique disclosed in U.S. Pat. No. 6,473,555 can be used to produce a 2-to-1 POF coupler having an end face with a cross-section that overlaps the cross section of the end of the main POF, due to the non-circular cross-sectional shape of the coupler end face, unacceptable insertion losses can still occur. For example, if the coupler end face has a cross-sectional area that is larger than that of the main POF end face such that there is cross-sectional overlap, the overlap may lead to improved optical coupling for light being coupled from the main POF into the coupler, but may lead to the occurrence of unacceptable insertion losses for light being coupled from the coupler into the main POF.

Accordingly, a need exists for a 2-to-1 POF optical coupler that provides a carefully-selected amount of overlap at the interface between the end face of the coupler and the end face of the main POF to reduce optical coupling losses in both direction in a bi-directional optical communications links.

SUMMARY OF THE INVENTION

The invention is directed to a POF 2-to-1 optical coupler, a bi-directional optical communications link in which the POF 2-to-1 optical coupler is used, and a method for performing 2-to-1 optical coupling in a bi-directional optical communications link. The optical coupler comprises first and second branch POFs and a coupler end face. The first branch POF has a first end, a second end, a core, and one or more cladding layers. The first end of the first branch POF has a generally circular cross section that defines a first end face of the first branch POF. The second branch POF has a first end, a second end, a core, and one or more cladding layers. The first end of the second branch POF has a generally circular cross section that defines a first end face of the second branch POF. The coupler end face is configured to interface with a first end face of a third POF. The coupler end face comprises the second ends of the first and second branch POFs. The second ends of the first and second branch POFs are deformed in shape and joined together to form the coupler end face and to provide the coupler end face with a generally circular cross section. The coupler end face has a cross-sectional area that is 10% to 20% greater than a cross-sectional area of the first end face of the third POF.

The POF bi-directional optical communications link comprises a link POF, a 2-to-1 optical coupler, a first optical transmitter (Tx) and a first optical receiver (Rx). The link POF has a first end, a second end, a core, and one or more cladding layers. The first end of the link POF has a generally circular cross section. The 2-to 1 optical coupler comprises a coupler end face that is coupled with the first end face of the link POF, a first branch POF having a first end, a second end, a core, and one or more cladding layers. The first end of the first branch POF has a generally circular cross section that defines a first end face of the first branch POF. The second branch POF has a first end, a second end, a core, and one or more cladding layers. The first end of the second branch POF has a generally circular cross section that defines a first end face of the second branch POF. The coupler end face comprises the second ends of the first and second branch POFs. The second ends of the first and second branch POFs are deformed in shape and joined together to form the coupler end face and to provide the coupler end face with a generally circular cross section that is 10% to 20% greater in area than a cross-sectional area of the first end face of the link POF. The first optical Tx is optically coupled with the first end of the first branch POF. The first optical Rx is optically coupled with the first end of the second branch POF.

The method comprises providing the POF bi-directional optical communications link, providing the 2-to-1 optical coupler in the link, and, in a first mode of operations, coupling light from the first end face of the link POF into the coupler end face and coupling light from the first end face of the second branch POF into a first optical Rx, and, in a second mode of operations, coupling light from an optical Tx into the first end face of the first branch POF and coupling light from the coupler end face into the first end face of the link POF.

These and other features and advantages of the invention will become apparent from the following description, drawings and claims.

BRIEF DESCRIPTION OF THE DRAWINGS

FIG. 1A illustrates a side view of a portion of a typical POF bi-directional optical communications link, which includes a 1.0 mm POF and a 2-to-1 optical coupler.

FIGS. 1B and 1C illustrate front plan views of the end faces of the main POF and of the coupler shown in FIG. 1A that interface with each other.

FIG. 2A illustrates a side plan view of a portion of a bi-directional optical communications link in accordance with an illustrative embodiment comprising a 1.0 mm main POF and a 2-to-1 POF optical coupler.

FIGS. 2B and 2C illustrate plan views of the end faces of the main POF and of the 2-to-1 optical coupler, respectively, shown in FIG. 2A that interface with each other.

FIG. 3 illustrates a plan view of the end face of the coupler in accordance with another illustrative embodiment.

FIGS. 7A-7C illustrate a side plan view, a back plan view and a front plan view, respectively, of a 2-to-1 optical coupler in accordance with another illustrative embodiment.

FIG. 8A illustrates a side view of a portion of a bi-directional optical communications link in accordance with another illustrative embodiment.

FIGS. 8B and 8C illustrate plan views of the end faces of the branch POFs of the coupler shown in FIG. 8A at the ends of the coupler where a Tx and Rx are intended to connect to the coupler.

FIG. 8D illustrates a plan view of the end face of the coupler shown in FIG. 8A on the end of the coupler that interfaces with the end of a main POF or POF pigtail.

DETAILED DESCRIPTION OF AN ILLUSTRATIVE EMBODIMENT

Figure 4:
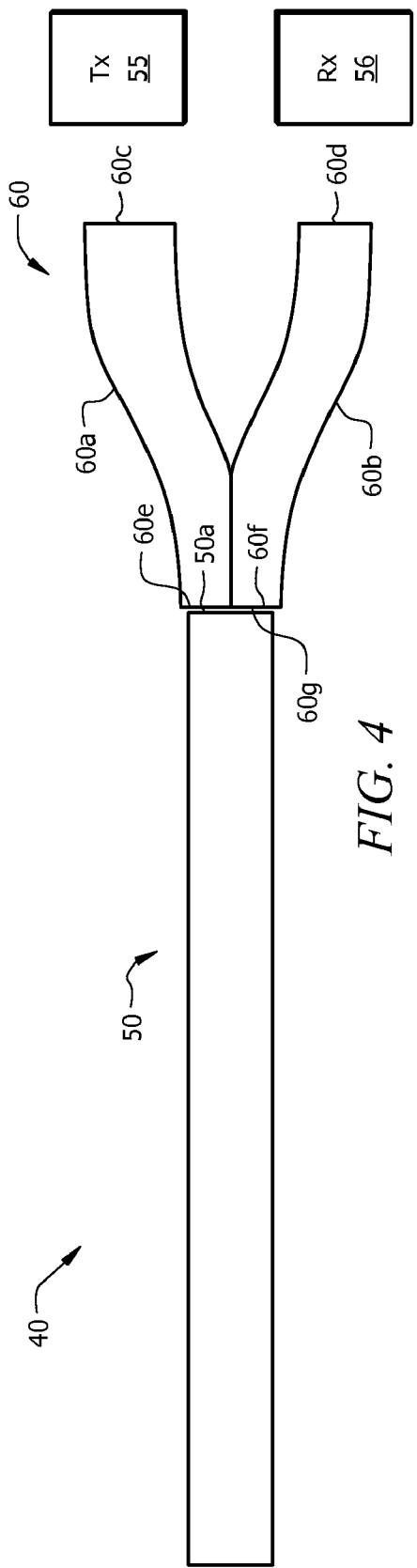
FIG. 4 illustrates a side plan view of a portion of a bi-directional optical communications link in accordance with another illustrative embodiment.

In accordance with the invention, embodiments of a 2-to-1 POF optical coupler. The 2-to-1 optical coupler is configured to provide an amount of cross-sectional overlap at the interface between the end face of a main POF or POF pigtail and the end face of the coupler. The amount of overlap is selected to ensure that optical coupling losses are reduced and optical efficiency is increased in both directions in a bi-directional optical communications links.

FIG. 2A illustrates a side plan view of a portion of a bi-directional optical communications link 10 in accordance with an illustrative embodiment. The link 10 includes a 1.0 mm main POF 20 and a 2-to-1 POF optical coupler 30. The optical coupler 30 is a branch-like structure having first and second branch POFs 30a and 30b. Each branch POF 30a and 30b is a 0.75 mm POF. The branch POFs 30a and 30b have end faces 30c and 30d, respectively, which typically, but not necessarily, interface with a Tx 25 and an Rx 26, respectively. The Tx 25 and the Rx 26 are typically part of an optical transceiver module (not shown). The end faces 30e and 30f of the branch POFs 30a and 30b, respectively, are combined via a hot embossing process to form a coupler end face 30g that has a generally circular cross-sectional shape. Therefore, the cross-sectional shape of the end face 30g of the coupler 30 is generally the same as the cross-sectional shape of the end face 20a of the main POF 20.

The cross-sectional area of the end face 30g of the coupler 30 is equal to approximately $(9/32)\pi$. The cross-sectional area of the end face 20a of the 1.0 mm main POF 20 is equal to approximately $(8/32)\pi$. The ratio of the cross-sectional area of the coupler end face 30g to the cross-sectional area of the main POF end face 20a is 9 to 8, or 1.125. Thus, in accordance with this embodiment, the cross-sectional area of the end face 30g is about 12.5% greater than the cross-sectional area of the end face 20a. This difference between the cross-sectional areas of the end faces 20a and 30g provides an amount of overlap between the end faces 20a and 30g that ensures that optical coupling losses (e.g., insertion losses) are reduced in both directions of light propagation in the bi-directional link 10. The amount of overlap is chosen so that it is not too large and not too small. In particular, the amount of overlap is large enough to ensure that light to be received by the Rx 26 is coupled with about 50% coupling loss (ratio of the fiber cross sections of end faces 30f to 20a) from the end face 20a of the main POF 20 into the end face 30g of the optical coupler 30. At the same time, the amount of overlap is larger than 100% (ratio of the fiber cross sections of end faces 20a to 30e) in order to ensure that very little or no optical losses occur when light generated by the Tx 25 is coupled from the coupler end face 30e into the end face 20a of the main POF 20. Consequently, optical losses are reduced or minimized in both directions of light propagation in the bi-directional optical communications link 10.

FIGS. 2B and 2C illustrate plan views of the end faces 20a and 30g of the main POF 20 and of the 2-to-1 optical coupler 30, respectively. It can be seen in FIGS. 2B and 2C that the cross-sectional areas of the end faces 20a and 30g are generally circular in shape. The main POF 20 comprises a fiber core 20h surrounded by one or more cladding layers 20i. Likewise, the branch POFs 30a and 30b comprise cores 30h and 30j, respectively, surrounded by one or more cladding layers 30i and 30k, respectively. Also, although the end faces 20a and 30g are not drawn to scale in FIGS. 2B and 2C, they are drawn to demonstrate that the cross-sectional area of the coupler end face 30g is larger than the cross-sectional area of the main POF end face 20a. As indicated above, the cross-sectional area of the end face 30g is greater than that of the end face 20a by about 12.5%.

While it is possible to use one 0.5 mm POF and one 1.0 mm POF as the branch POFs 30a and 30b, the use of a 0.5 mm POF and a 1.0 mm POF for this purpose would result in the coupler end face 30g having a cross-sectional area of $(10/32)\pi$. This would result in the cross-sectional area of the coupler end face 30g being about 25% greater than the cross-sectional area of the main POF end face 20a, which is too large to sufficiently reduce optical coupling losses in both directions in the bi-directional link. In other words, although a 25% overlap may eliminate or reduce optical losses when light is coupled from the end face 20a into the end face 30g, this large of an overlap may increase the chances of optical losses when light is coupled from the end face 30g into the end face 20a. The ratio of the cross-sectional areas of the end faces 30g and 20a should be greater than 1 and less than 10/8, or 1.25. Preferably, the ratio of the cross-sectional areas of the end faces 30g and 20a should be about 9/8, or 1.125, which corresponds to the cross-sectional area of the end face 30g being about 12.5% greater than the cross-sectional area of the end face 20a. It should be noted, however, that the invention is not limited to any particular ratio of the cross-sectional areas of the end faces 30g and 20a. Typically, the cross-sectional area of the end face 30g of the coupler 30 will be about 10% to 20% greater than the cross-sectional area of the end face 20a of the main POF 20.

During the hot embossing process, an embossing tool (not shown) is used to shape the ends 30e and 30f of the branch POFs 30a and 30b, respectively. A single embossing tool may be used in combination with heat to shape the ends 30e and 30f of the POFs 30a and 30b, respectively. During the hot embossing process, the embossing tool shapes each of the ends 30e and 30f into generally semi-circularly shaped cross-sections, as shown in FIG. 2C. The ends 30e and 30f are then secured to one another by an attachment mechanism, such as, for example, a refractive index-matching epoxy (index equal to or less than the cladding index). Unlike the coupler 3 described above with reference to FIGS. 1A-1C, it is unnecessary to place a metallic layer between the branch POFs, such as layer 7 shown in FIGS. 1A and 1C. The reason for this is that, although the hot embossing process deforms the ends 30e and 30f of the branch POFs 30a and 30b, respectively, the process leaves the cladding layers 30i and 30k intact. The cladding layers 30i and 30k prevent light from being coupled between the branch POFs 30a and 30b.

As an alternative to using the same embossing tool to deform both of the branch POFs 30a and 30b, two different embossing tools (not shown) that have complementary shapes to one another may be used for this purpose. FIG. 3 illustrates a plan view of the end face 30g of the coupler 30 in accordance with this alternative embodiment. The large dashed circle represents the end face 20a of the main POF 20. The smaller solid circles represent the end faces 30c and 30d of the coupler 30. The non-circular cross-sectional shapes represent the cores 30h and 30j of the branch POFs 30a and 30b, respectively, which have been deformed via the hot embossing process. For ease of illustration, the cladding layers 30i and 30k shown in FIG. 2C are not shown in FIG. 3, although they are present in the branch POFs 30a and 30b. The deformed cores 30h and 30j have complementary shapes that are partially circular and partially non-circular in cross section. In accordance with this embodiment, the cross-sectional area of the deformed core 30j is equal to the cross-sectional area of the deformed core 30h, as both are deformed using 0.75 mm POFs. The coupler end face 30g, however, still has a generally circular cross-sectional shape and a cross-sectional area of approximately $(9/32)\pi$, which is about 12.5% greater than the cross-sectional area of the end face 20a of the main POF 20 (FIG. 2A).

The disparity between the shapes of the cross-sections of the deformed cores 30h and 30j shown in FIG. 3 can provide certain advantages. For example, the optical power is not equal versus the cross section at the main POF end face 20a (assuming optical power is going thru from left to right in the considered receiver setup). Rather, the optical power is higher at the middle of the cross-section of end face 20a. Therefore the optical coupling loss into the cross-section of core 30j is lower than 50%, yielding a higher optical power at the Rx 26. The optical power of the Tx 25 is coupled via the core 30h into end face 20a only at the outer region of the core area of end face 20a, but it will be distributed inside the main POF 20 such that at the end face 20b, most of the optical power will be concentrated in the middle of the core of the main POF 20.

FIG. 4 illustrates a side plan view of a portion of a bi-directional optical communications link 40 in accordance with another illustrative embodiment. The link 40 includes a main POF 50 and a 2-to-1 POF optical coupler 60. The optical coupler 60 is a branch-like structure having first and second branch POFs 60a and 60b. In accordance with this embodiment, the main POF is a 1.0 mm POF and each branch POF 60a and 60b is a 0.75 mm POF. The branch POFs 60a and 60b have end faces 60c and 60d, respectively, which typically, but not necessarily, interface with a Tx 55 and an Rx 56, respectively. The Tx 55 and the Rx 56 are typically part of an optical transceiver module (not shown). The end faces 60e and 60f of the branch POFs 60a and 60b, respectively, are combined via a hot embossing process to form a coupler end face 60g that has a generally circular cross-sectional shape so that the cross-sectional shapes of the end face 60g of the coupler 60 and the end face 50a of the main POF 50 are generally the same.

The cross-sectional area of the coupler end face 60g of the coupler 60 is equal to approximately $(9/32)\pi$. The cross-sectional area of the end face 50a of the 1.0 mm main POF 50 is equal to approximately $(8/32)\pi$. Thus, the cross-sectional area of the coupler end face 60g is greater than the cross-sectional area of the main POF end face 50a by a factor of 9/8, or about 12.5%. As described above, this difference between the cross-sectional areas of the end faces 50a and 60g provides an amount of overlap between the end faces 50a and 60g that ensures that optical coupling losses are reduced in both directions of light propagation in the bi-directional link 40. The amount of overlap is chosen so that it is not too large or too small. In particular, the amount of overlap is chosen to be large enough to ensure that light to be received by the Rx 56 is coupled with very little or no optical loss from the end face 50a of the main POF 50 into the coupler end face 60g. At the same time, the amount of overlap is chosen to be small enough to ensure that very little or no optical losses occur when light generated by the Tx 55 is coupled from the coupler end face 60g into the end face 50a of the main POF 50. Consequently, optical losses are reduced or minimized in both directions of light propagation in the bi-directional optical communications link 40.

The optical coupler 60 shown in FIG. 4 is identical to the optical coupler 30 shown in FIGS. 2A-2C except that the end face 60c of the POF branch 60a of the optical coupler 60 has been up-tapered through the use of a known up-tapering process to increase the cross-sectional area of the end face 60c. In general, the up-tapering process is a process during which heat is applied to the end face 60c as forces are applied to the end face 60c to enlarge the end face 60c and increase its cross-sectional area. Increasing the cross-sectional area of the end face 60c in this manner decreases the chance that a portion of the light that is generated by the Tx 55 will be lost when it is coupled into the end face 60c.

Figure 5A:
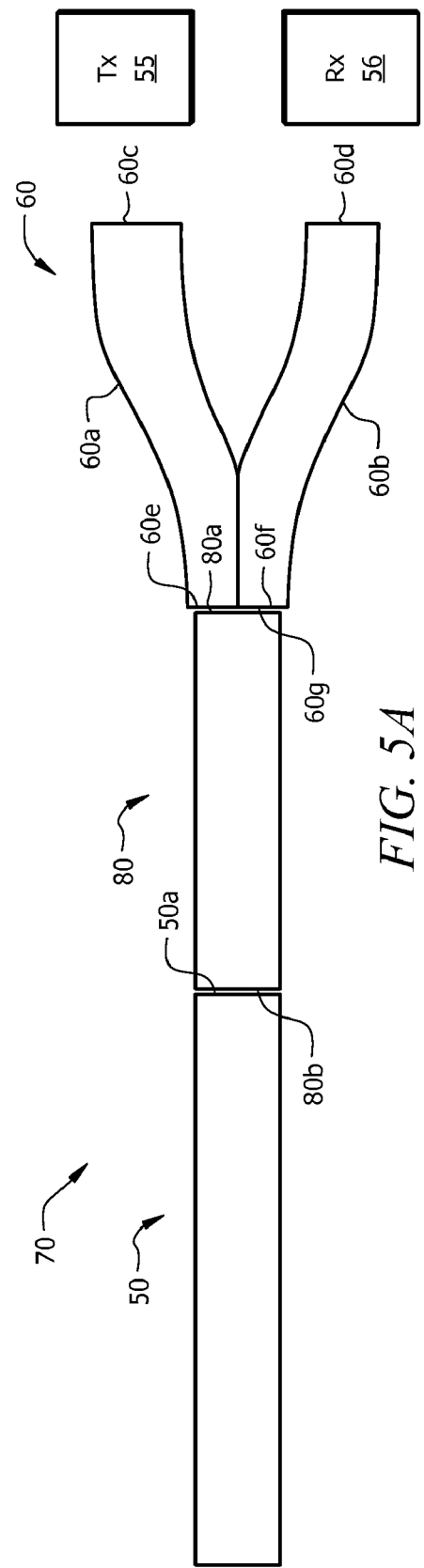
FIG. 5A illustrates a side plan view of a portion of a bi-directional optical communications link in accordance with another illustrative embodiment.

FIG. 5A illustrates a side plan view of a portion of a bi-directional optical communications link 70 in accordance with another illustrative embodiment. The link 70 includes the 1.0 mm main POF 50 and the 2-to-1 POF optical coupler 60 shown in FIG. 4. In addition, however, the link 70 includes a 1.0 mm POF pigtail 80 having first and second end faces 80a and 80b, respectively, that are connected to the end faces 60g and 50a, respectively, of the optical coupler 60 and of the main POF 50, respectively. The end face 80a of the POF pigtail 80 is secured to the end face 60g of the coupler 60 by refractive index-matching epoxy or glue to prevent reflection and loss of light at the interface of the end faces 80a and 60g. Likewise, the end face 80b and the end face 50a of the POF pigtail 80 and of the main POF 50, respectively, are secured to one another by refractive index-matching epoxy to prevent reflection and optical losses from occurring at this interface.

The cross-sectional area of the end face 60g of the coupler 60 is equal to approximately $(9/32)\pi$. The cross-sectional area of the end face 80a of the 1.0 mm POF pigtail 80 is equal to approximately $(8/32)\pi$. Thus, as described above, the cross-sectional area of the coupler end face 60g is approximately 12.5% greater than the cross-sectional area of the end face 80a of the POF pigtail 80. This difference between the cross-sectional areas of the end faces 80a and 60g provides an amount of overlap between the end faces 80a and 60g that ensures that optical coupling losses (e.g., insertion losses) are eliminated or reduced in both directions of light propagation in the bi-directional link 70. As indicated above with reference to FIGS. 2A-2C, the amount of overlap is chosen so that it is not too large or too small. In particular, the amount of overlap is large enough to ensure that light to be received by the Rx 56 is coupled with about 50% loss (ratio of end face 60f to end face 80a) from the end face 80a of the POF pigtail 80 into the end face 60f of the branch POF 60b. On the other hand, the amount of overlap is small enough to ensure that very little or no optical losses occur when light generated by the Tx 55 is coupled from the end face 60e of the branch POF 60a into the pigtail end face 80a. Consequently, optical losses are reduced or minimized in both directions of light propagation in the bi-directional optical communications link 70.

Figure 5B:
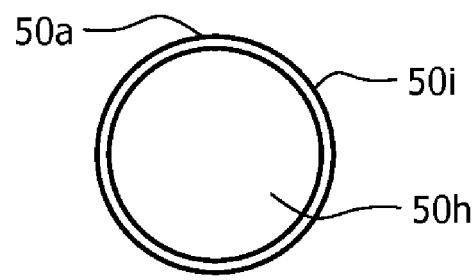
FIGS. 5B, 5C and 5D illustrate plan views of the end faces of the main POF, the POF pigtail and the optical coupler, respectively, shown in FIG. 5A.
Figure 5C:
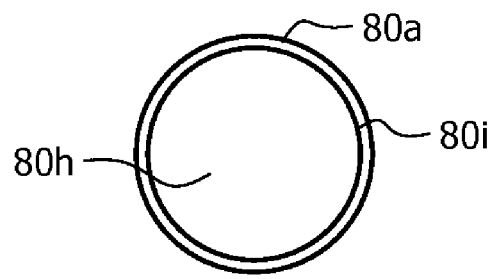
Figure 5D:
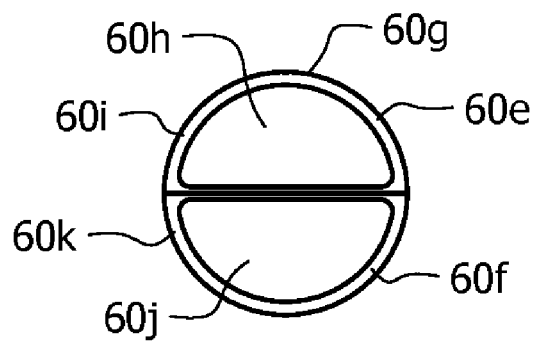

FIGS. 5B, 5C and 5D illustrate plan views of the end faces 50a, 80a and 60g of the main POF 50, the POF pigtail 80 and the optical coupler 60, respectively. The cross-sections of the end faces 50a and 80a of the main POF 50 and of the POF pigtail 80, respectively, are identical to one another. The cross-sectional areas of the end faces 50a, 80a and 60g are generally circular in shape. The main POF 50 comprises a fiber core 50h surrounded by one or more cladding layers 50i. Likewise, the POF pigtail 80 comprises a fiber core 80h surrounded by one or more cladding layers 80i. Likewise, the branch POFs 60a and 60b comprise cores 60h and 60j, respectively, surrounded by one or more cladding layers 60i and 60k, respectively. Also, although the end faces 80a and 60g are not drawn to scale in FIGS. 5C and 5D, they are drawn to demonstrate that the cross-sectional area of the coupler end face 60g is larger than the cross-sectional area of the POF pigtail end face 80a. As indicated above, the cross-sectional area of the end face 60g is greater than that of the end face 80a by about 12.5%. It should be noted, however, that the invention is not limited to any particular ratio of the cross-sectional areas of the end faces 60g and 80a. Typically, the cross-sectional area of the end face 60g of the coupler 60 will be about 10% to 20% greater than the cross-sectional area of the end face 80a of the POF pigtail 80.

The hot embossing process described above is used to shape the ends 60e and 60f of the branch POFs 60a and 60b, respectively. A single hot embossing tool may be used to shape the ends 60e and 60f of the POFs 60a and 60b, respectively. During the hot embossing process, the embossing tool shapes each of the ends 60e and 60f into generally semi-circularly shaped cross sections, as shown in FIG. 5D. The ends 60e and 60f are then secured to one another by a securing material, such as, for example, a refractive index-matching epoxy. Unlike the coupler 3 described above with reference to FIGS. 1A-1C, it is unnecessary to place a metallic layer between the branch POFs 60a and 60b, such as layer 7 shown in FIGS. 1A and 1C. As indicated above with reference to FIGS. 2A-2C, the reason that such a metal layer is unnecessary is because the hot embossing process leaves the cladding layers 60i and 60k intact. The cladding layers 60i and 60k prevent light from being coupled between the branch POFs 60a and 60b. Alternatively, two embossing tools (not shown) having complementary shapes may be used to shape the branch POF end faces 60e and 60f to give them shapes such as that shown in FIG. 3.

Figure 6A:
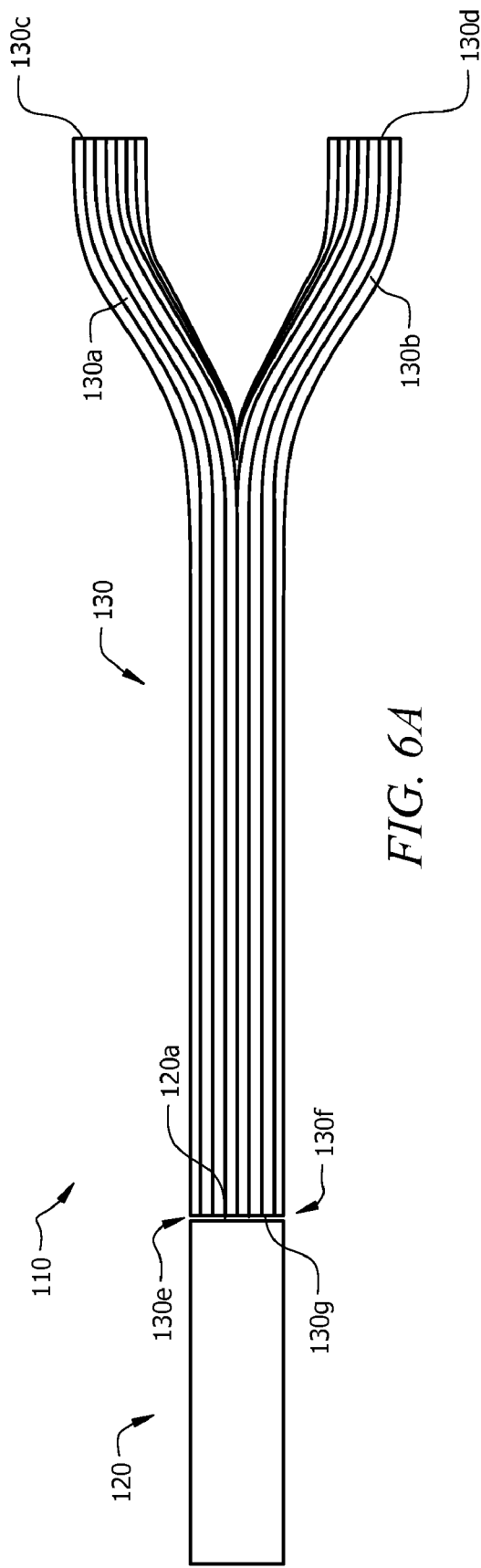
FIG. 6A illustrates a side view of a portion of a bi-directional optical communications link in accordance with another illustrative embodiment.
Figures 6B, 6C:
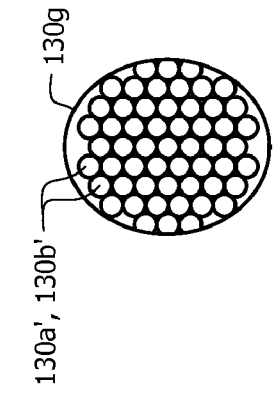
FIGS. 6B and 6C illustrate plan views of the end faces of the branch POFs of the coupler shown in FIG. 6A at the ends of the coupler where a Tx and a Rx are intended to connect to the coupler.

FIG. 6A illustrates a side view of a portion of a bi-directional optical communications link 110 in accordance with another illustrative embodiment. The link 110 includes a main POF 120 and a 2-to-1 POF optical coupler 130. The optical coupler 130 is a branch-like structure having first and second branch POFs 130a and 130b. Each branch POF 130a and 130b is a multi-core POF (MCPOF) made up of a respective plurality of POF cores 130a' and 130b'. Each MCPOF 130a and 130b typically has an outer diameter of between about 0.74 and 0.75 mm. The main POF is typically a 1.0 mm POF. The above-described hot embossing process is used to provide the end faces 130c and 130d of the MCPOFs 130a and 130b, respectively, with the generally circular cross-sectional shapes shown in FIGS. 6B and 6C, respectively. The end faces 130c and 130d are configured to connect to an optical Tx (not shown) and to an optical Rx (not shown), respectively, which are typically part of an optical transceiver module (not shown).

Figures 6D, 6E:
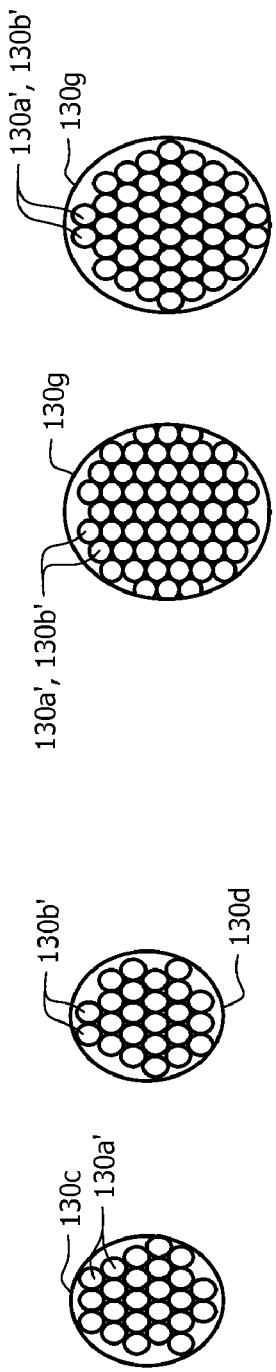
FIGS. 6D and 6E illustrate plan views of alternative configurations for the end face of the coupler shown in FIG. 6A.

At the ends 130e and 130f of the MCPOFs 130a and 130b, respectively, opposite the end faces 130c and 130d, respectively, the above-described hot embossing process is used to form the coupler end face 130g having the generally circular cross-sectional shapes shown in either of FIGS. 6D and 6E. FIG. 6D illustrates a plan view of the end face 130g in accordance with an illustrative embodiment in which the cores 130a' and 130b' are arranged in hexagonal array. FIG. 6E illustrates a plan view of the end face 130g in accordance with an illustrative embodiment in which the cores 130a' and 130b' are arranged in a circular array.

The cross-sectional area of the end face 130g of the coupler 130 is equal to approximately $(9/32)\pi$. The cross-sectional area of the end face 120a of the 1.0 mm main POF 120 is equal to approximately $(8/32)\pi$. Thus, the cross-sectional area of the coupler end face 130g is greater than the cross-sectional area of the main POF end face 120a by a factor of 9/8, or 1.125. This difference between the cross-sectional areas of the end faces 120a and 130g provides an amount of overlap between the end faces 120a and 130g that ensures that optical coupling losses (e.g., insertion losses) are reduced to about 50% (the ratio of half of the cross section of end face 130g to the cross section of end face 120a) in both directions of light propagation in the bi-directional link 110. As indicated above, the amount of overlap is chosen so that it is not too large and not too small. In particular, the amount of overlap is chosen to be large enough to ensure that there is very little, if any, loss of light being coupled from the Tx (not shown) to the end face 120a of the main POF 120 and only a loss of about 50% into the end face 130d, which power is coupled to the Rx (not shown here). Consequently, optical losses are reduced to about 50% in both directions of light propagation in the bi-directional optical communications link 110. In this case, the 50% loss occurs at the receiver side of the transmission link.

FIGS. 7A-7C illustrate a side plan view (FIG. 7A), a back plan view (FIG. 7B) and a front plan view (FIG. 7C) of a 2-to-1 optical coupler 150 in accordance with another illustrative embodiment. The optical coupler 150 may be identical to the optical coupler 130 described above with reference to FIGS. 5A-5E except that the cores 150a' and 150b' of the branch MCPOFs 150a and 150b, respectively, are not separated out to form separate end faces. Rather, the above-described hot embossing process is used to shape the ends 150c and 150d of the MCPOFs 150a and 150b, respectively, into an end face comprising two generally circular cross-sectional areas 150c' and 150d' that are interconnected. The POF cores 150a' and 150b' that are contained in the areas 150c' and 150d', respectively, transmit light and receive light, respectively, propagating in first and second directions, respectively. On the end 150f of the coupler 150, the hot embossing process is used to create an end face 150g having a generally circular cross-sectional shape and having a cross-sectional area of about $(9/32)\pi$.

The end face 150e of the coupler 150 may be connected to a first integrated circuit (IC) chip (not shown) having light-emitting and light-receiving regions that are adjacent one another on the chip. The light-receiving region of the chip (not shown) receives light propagating out of the cores 150b'. The light-emitting region on the chip (not shown) generates light that is coupled at the end 150e into the cores 150a'. The opposite end face 150g located on end 150f of the coupler 150 may be connected to a transmission fiber (not shown), such as a main POF or a POF pigtail. The coupler 150 is a very compact version of the coupler of the invention and can therefore be easily integrated in a transceiver housing (not shown).

FIG. 8A illustrates a side view of a portion of a bi-directional optical communications link 160 in accordance with another illustrative embodiment. The link 160 includes a main POF 170 and a 2-to-1 POF optical coupler 180. The optical coupler 180 is a branch-like structure having a first MCPOF 180a and a second single-core POF 180b. The first MCPOF 180a is typically a 0.75 mm MCPOF comprising multiple cores 180a', as shown in the plan view of the end face 180c shown in FIG. 8B. The second single-core POF 180b is typically a 0.70 mm POF having a single core 180b', as shown in the plan view of the end face 180d shown in FIG. 8C. The end faces 180c and 180d may couple to a TX and an Rx (not shown), respectively. The aforementioned hot embossing process is used to create a coupler end face 180g in which the cores 180a' of the MCPOF 180a surround the core 180b' of the single-core POF 180b, as shown in the plan view of the end face 180g shown in FIG. 8D. The end face 180g has a cross-sectional area that is about $(9/32)\pi$. The end face 170a of the main POF 170 has a cross-sectional area that is about $(8/32)\pi$. Therefore, as with the illustrative embodiments described above with reference to FIGS. 2A-7C, the cross-sectional are of the end face 180g is about 12.5% greater than the cross-sectional area of the end face 170a.

In one direction of light propagation, light coupled into the cores 180a' at the end face 180c is coupled at the end face 180g from the cores 180a' into the core of the main POF 170. In the opposite direction of light propagation, light is coupled from the core of the main POF 170 into the center core 188b' of the POF 180b. The light is then coupled from the end face 180d of the POF 180b into the Rx (not shown). The overlapping of the end faces 180g and 170a ensures that optical coupling losses are minimized for light being coupled between the end faces 170a and 180g. In other words, because the power density is higher in the middle of the POF at the receiver side, more power will be coupled in the branch POF 180b than the cross-section ratio of end faces 180d to 170a will yield.

It can be seen from the illustrative embodiments described herein that the overlapping configuration of the 2-to-1 optical coupler enables optical coupling losses to be reduced and/or minimized at the interface between the main POF and the coupler in both directions of light propagation in the bi-directional link. This feature improves signal integrity in a bi-directional POF link, allows optical power budget constraints to be met, allows the length of the bi-directional optical link to be increased, and allows the overall cost of the link to be reduced.

It should be noted that the invention has been described with respect to illustrative embodiments for the purpose of demonstrating the principles and concepts of the invention. The invention, however, is not limited to these embodiments. For example, while the invention has been described with reference to particular POF configurations, other POF configurations may also be used. Also, in the interest of brevity, only a portion of the bi-directional links have been shown and described. Additional components may be included in the link and link components illustrated in the drawings may be varied or removed altogether. As will be understood by those skilled in the art in view of the description being provided herein, many modifications may be made to the embodiments described herein while still achieving the goals of the invention, and all such modifications are within the scope of the invention.

What is claimed is:

1. A plastic optical fiber (POF) 2-to-1 optical coupler for use in a bi-directional optical communications link, the optical coupler comprising:
   a first branch POF having a first end, a second end, a core, and one or more cladding layers, the first end of the first branch POF having a generally circular cross section that defines a first end face of the first branch POF;
   a second branch POF having a first end, a second end, a core, and one or more cladding layers, the first end of the second branch POF having a generally circular cross section that defines a first end face of the second branch POF; and
   a coupler end face configured to interface with a first end face of a third POF, the coupler end face comprising the second ends of the first and second branch POFs, wherein the second ends of the first and second branch POFs are deformed in shape and joined together to form the coupler end face and to provide the coupler end face with a generally circular cross section, and wherein the coupler end face has a cross-sectional area that is 10% to 20% greater than a cross-sectional area of the first end face of the third POF.

2. The POF 2-to 1 optical coupler of claim 1, wherein the coupler end face has a cross-sectional area that is about 12.5% greater than a cross-sectional area of the first end face of the third POF.

3. The POF 2-to 1 optical coupler of claim 1, wherein the coupler end face has a diameter that is about 1.125 millimeters (mm) and wherein the first end face of the third POF has a diameter of about 1.0 mm.

4. The POF 2-to 1 optical coupler of claim 1, wherein the coupler end face has a diameter that is about $(9/10)\pi$ millimeters (mm) and wherein the first end face of the third POF has a diameter of about $(8/10)\pi$ mm.

5. The POF 2-to-1 optical coupler of claim 1, wherein the first and second branch POFs are first and second single core POFs, respectively, the first end faces of the first and second branch POFs being about 0.75 millimeters (mm) in diameter, wherein the joining together of the second ends of the first and second branch POFs provides the coupler end face with the generally circular cross section and the cross-sectional area that is 10% to 20% greater than the cross-sectional area of the first end face of the third POF.

6. The POF 2-to-1 optical coupler of claim 1, wherein the first branch POF is a multi-core POF (MCPOF) comprising multiple cores and the second branch POF is a single-core POF comprising a single core, the first end of the MCPOF having a diameter of about 0.75 millimeters (mm) and the first end of the single core POF having a diameter of about 0.70 mm, and wherein the joining together of the second ends of the MCPOF and of the single-core POF provides at the coupler end face with a cross section in which the cores of the MCPOF surround the single core of the single-core POF.

7. The POF 2-to-1 optical coupler of claim 1, wherein the first and second branch POFs are first and second multi-core POFs (MCPOFs), each of the MCPOFs comprising multiple cores, and wherein the joining together of the second ends of the MCPOFs provides at the coupler end face with a cross section in which the cores of the MCPOFs are arranged in an array that is generally circular in shape to provide the coupler end face with the generally circular cross section.

8. The POF 2-to-1 optical coupler of claim 1, wherein the first and second branch POFs are first and second multi-core POFs (MCPOFs), each of the MCPOFs comprising multiple cores, and wherein the joining together of the second ends of the MCPOFs provides the coupler end face with a cross section in which the cores of the MCPOFs are arranged in a hexagonal pattern that approximates a circle such that the coupler end face has the generally circular cross section.

9. The POF 2-to-1 optical coupler of claim 1, wherein the first and second branch POFs are first and second multi-core POFs (MCPOFs), each of the MCPOFs comprising multiple cores, and wherein the generally circular cross sections of the first ends of the first and second MCPOFs are interconnected, and wherein the joining together of the second ends of the MCPOFs provides the coupler end face with the generally circular cross section, and wherein the cores of the MCPOFs are arranged in a circular pattern at the coupler end face such that the coupler end face has the generally circular cross section.

10. The POF 2-to-1 optical coupler of claim 1, wherein the first and second branch POFs are first and second single core POFs, respectively, the first end face of the second branch POF being about 0.75 millimeters (mm) in diameter, the first end face of the first POF being up-tapered to be greater than 0.75 mm in diameters, wherein the joining together of the second ends of the first and second branch POFs provides the coupler end face with the generally circular cross section and the cross-sectional area that is 10% to 20% greater than the cross-sectional area of the first end face of the third POF.

11. The POF 2-to-1 optical coupler of claim 1, wherein at the coupler end face where the second ends of the branch POFs are joined, the cladding layers of the branch POFs prevent light propagating in one of the branch POFs from entering into the other of the branch POFs.

12. An plastic optical fiber (POF) bi-directional optical communications link, the link comprising:
   a link POF having a first end, a second end, a core, and one or more cladding layers, the first end of the link POF having a generally circular cross section;
   a 2-tot optical coupler comprising:
      a coupler end face that is coupled with the first end face of the link POF,
      a first branch POF having a first end, a second end, a core, and one or more cladding layers, the first end of the first branch POF having a generally circular cross section that defines a first end face of the first branch POF, and
      a second branch POF having a first end, a second end, a core, and one or more cladding layers, the first end of the second branch POF having a generally circular cross section that defines a first end face of the second branch POF, and wherein the coupler end face comprises the second ends of the first and second branch POFs, and wherein the second ends of the first and second branch POFs are deformed in shape and joined together to form the coupler end face and to provide the coupler end face with a generally circular cross section, and wherein the coupler end face has a cross-sectional area that is 10% to 20% greater than a cross-sectional area of the first end face of the link POF; and
   a first optical transmitter (Tx) optically coupled with the first end of the first branch POF; and
   a first optical receiver (Rx)) optically coupled with the first end of the second branch POF.

13. The POF bi-directional optical communications link of claim 12, wherein the coupler end face has a cross-sectional area that is about 12.5% greater than a cross-sectional area of the first end face of the link POF.

14. The POF bi-directional optical communications link of claim 12, wherein the coupler end face has a diameter that is about 1.125 millimeters (mm) and wherein the first end face of the third POF has a diameter of about 1.0 mm.

15. The POF bi-directional optical communications link of claim 12, wherein the coupler end face has a diameter that is about $(9/10)\pi$ millimeters (mm) and wherein the first end face of the link POF has a diameter of about $(8/10)\pi$ mm.

16. The POF bi-directional optical communications link of claim 12, wherein the first and second branch POFs are first and second single core POFs, respectively, the first end faces of the first and second branch POFs being about 0.75 millimeters (mm) in diameter, wherein the joining together of the second ends of the first and second branch POFs provides the coupler end face with the generally circular cross section and the cross-sectional area that is 10% to 20% greater than the cross-sectional area of the first end face of the link POF.

17. The POF bi-directional optical communications link of claim 12, wherein the first branch POF is a multi-core POF (MCPOF) comprising multiple cores and the second branch POF is a single-core POF comprising a single core, the first end of the MCPOF having a diameter of about 0.75 millimeters (mm) and the first end of the single core POF having a diameter of about 0.70 mm, and wherein the joining together of the second ends of the MCPOF and of the single-core POF provides at the coupler end face with a cross section in which the cores of the MCPOF surround the single core of the single-core POF.

18. The POF bi-directional optical communications link of claim 12, wherein the first and second branch POFs are first and second multi-core POFs (MCPOFs), each of the MCPOFs comprising multiple cores, and wherein the joining together of the second ends of the MCPOFs provides at the coupler end face with a cross section in which the cores of the MCPOFs are arranged in an array that is generally circular in shape to provide the coupler end face with the generally circular cross section.

19. The POF bi-directional optical communications link of claim 12, wherein the first and second branch POFs are first and second multi-core POFs (MCPOFs), each of the MCPOFs comprising multiple cores, and wherein the joining together of the second ends of the MCPOFs provides the coupler end face with a cross section in which the cores of the MCPOFs are arranged in a hexagonal pattern that approximates a circle such that the coupler end face has the generally circular cross section.

20. The POF bi-directional optical communications link of claim 12, wherein the first and second branch POFs are first and second multi-core POFs (MCPOFs), each of the MCPOFs comprising multiple cores, and wherein the generally circular cross sections of the first ends of the first and second MCPOFs are interconnected, and wherein the joining together of the second ends of the MCPOFs provides the coupler end face with the generally circular cross section, and wherein the cores of the MCPOFs are arranged in a circular pattern at the coupler end face such that the coupler end face has the generally circular cross section.

21. The POF bi-directional optical communications link of claim 12, wherein at the coupler end face where the second ends of the branch POFs are joined, the cladding layers of the branch POFs prevent light propagating in one of the branch POFs from entering into the other of the branch POFs.

22. A method for performing 2-to-1 optically coupling in a bi-directional optical communications link, the method comprising:
providing a link POF having a first end, a second end, a core, and one or more cladding layers, the first end of the link POF having a generally circular cross section;
providing a 2-to 1 optical coupler comprising:
a coupler end face that is coupled with the first end face of the link POF,
a first branch POF having a first end, a second end, a core, and one or more cladding layers, the first end of the first branch POF having a generally circular cross section that defines a first end face of the first branch POF, and
a second branch POF having a first end, a second end, a core, and one or more cladding layers, the first end of the second branch POF having a generally circular cross section that defines a first end face of the second branch POF, and wherein the coupler end face comprises the second ends of the first and second branch POFs, and wherein the second ends of the first and second branch POFs are deformed in shape and joined together to form the coupler end face and to provide the coupler end face with a generally circular cross section, and wherein the coupler end face has a cross-sectional area that is 10% to 20% greater than a cross-sectional area of the first end face of the link POF;
in a first mode of operations, coupling light from the first end face of the link POF into the coupler end face of the 2-to-1 optical coupler and coupling light from the first end face of the second branch POF into a first optical receiver; and
in a second mode of operations, coupling light from an optical transmitter (Tx) into the first end face of the first branch POF and coupling light from the coupler end face into the first end face of the link POF.

23. The method of claim 22, wherein the coupler end face has a cross-sectional area that is about 12.5% greater than a cross-sectional area of the first end face of the link POF.

24. The method of claim 22, wherein the coupler end face has a diameter that is about 1.125 millimeters (mm) and wherein the first end face of the third POF has a diameter of about 1.0 mm.

25. The method of claim 22, wherein the coupler end face has a diameter that is about $(9/10)\pi$ millimeters (mm) and wherein the first end face of the link POF has a diameter of about $(8/10)\pi$ mm.

26. The method of claim 22, wherein the first and second branch POFs are first and second single core POFs, respectively, the first end faces of the first and second branch POFs being about 0.75 millimeters (mm) in diameter, wherein the joining together of the second ends of the first and second branch POFs provides the coupler end face with the generally circular cross section and the cross-sectional area that is 10% to 20% greater than the cross-sectional area of the first end face of the link POF.

27. The method of claim 22, wherein the first branch POF is a multi-core POF (MCPOF) comprising multiple cores and the second branch POF is a single-core POF comprising a single core, the first end of the MCPOF having a diameter of about 0.75 millimeters (mm) and the first end of the single core POF having a diameter of about 0.70 mm, and wherein the joining together of the second ends of the MCPOF and of the single-core POF provides at the coupler end face with a cross section in which the cores of the MCPOF surround the single core of the single-core POF.

28. The method of claim 22, wherein the first and second branch POFs are first and second multi-core POFs (MCPOFs), each of the MCPOFs comprising multiple cores, and wherein the joining together of the second ends of the MCPOFs provides at the coupler end face with a cross section in which the cores of the MCPOFs are arranged in an array that is generally circular in shape to provide the coupler end face with the generally circular cross section.

29. The method of claim 22, wherein the first and second branch POFs are first and second multi-core POFs (MCPOFs), each of the MCPOFs comprising multiple cores, and wherein the joining together of the second ends of the MCPOFs provides the coupler end face with a cross section in which the cores of the MCPOFs are arranged in a hexagonal pattern that approximates a circle such that the coupler end face has the generally circular cross section.

30. The method of claim 22, wherein the first and second branch POFs are first and second multi-core POFs (MCPOFs), each of the MCPOFs comprising multiple cores, and wherein the generally circular cross sections of the first ends of the first and second MCPOFs are interconnected, and wherein the joining together of the second ends of the MCPOFs provides the coupler end face with the generally circular cross section, and wherein the cores of the MCPOFs are arranged in a circular pattern at the coupler end face such that the coupler end face has the generally circular cross section.

31. The method of claim 22, wherein at the coupler end face where the second ends of the branch POFs are joined, the cladding layers of the branch POFs prevent light propagating in one of the branch POFs from entering into the other of the branch POFs.

\* \* \* \* \*